Patented Aug. 27, 1929.

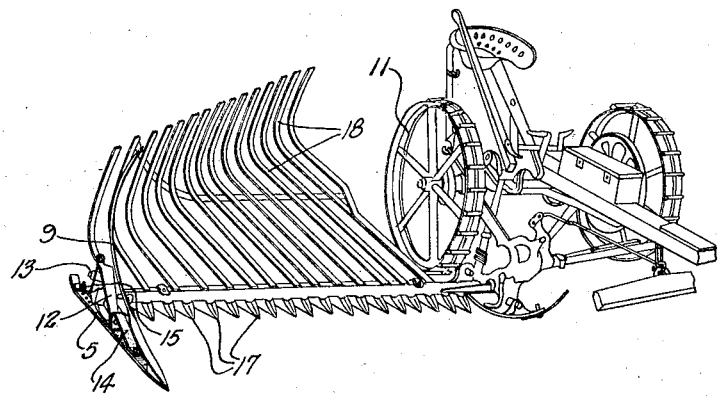
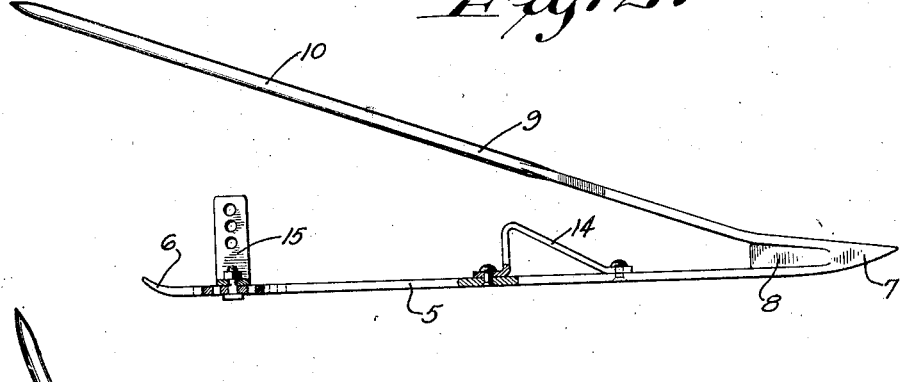
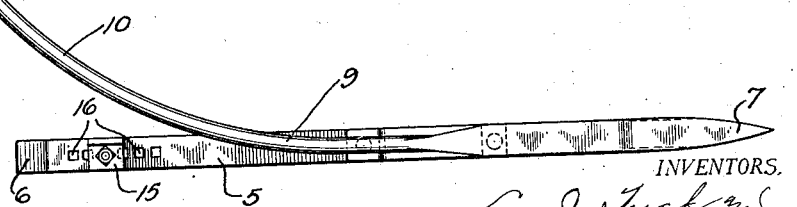

1,726,007

UNITED STATES PATENT OFFICE.

LEO J. TUCK AND LOUIS GETZINGER, OF SUN PRAIRIE, WISCONSIN.

CROP GUARD AND DIVIDER.

Application filed September 7, 1926. Serial No. 133,976.

This invention relates to improvements in crop guards and dividers.

Heretofore, in mowing or cutting crops of a matted or entangled nature for harvesting, it has been found that of each row traversed by the mower or cutter, the crops on the edge thereof are ruined by the side portion of the machine and out of an entire field the aggregate of the wasted strips is considerable.

It is, therefore, the primary object of the present invention to overcome the above objection by providing an attachment for the side portions of cutters which will separate the plants and prevent their being rendered unfit for harvest.

A further object of the invention is to provide a device of the class described which will separate the plants along the outer edge of the cutter and elevate them after being cut, and distribute the cut plants into windrows.

A further object of the invention is to provide a crop guard and divider readily attachable to the ordinary form of mower or cutter.

A further object of the invention is to provide a device of the class described which is of very simple construction, is inexpensive to manufacture, is strong and durable, and is well adapted for the purposes described.

With the above and other objects in view the invention consists of the improved crop guard and divider, and its parts and combinations as set forth in the claims and all equivalents thereof.

In the accompanying drawing in which the same reference characters indicate the same parts in all of the views:

Fig. 1 is a perspective view of a cutter equipped with the improved guard;

Fig. 2 is a side view of the guard detached from the machine and on a larger scale; and Fig. 3 is a plan view thereof.

Referring now more particularly to the drawing it will appear that the device comprises a flat runner 5 slightly upturned at its rear end portion 6. The front end portion 7 is also slightly upturned and pointed and provided with a block portion 8 to lend strength and rigidity.

Extending angularly upwardly and rearwardly from the portion 7 is a member 9 providing elevating means for the crops. Said member 9 is integral with the block 8 and runner 5 and the lower portion of the same is flattened and then merges into a reduced and rounded arm portion 10 which is curved inwardly, as shown in Fig. 3.

The device is adapted for attachment to mowers or cutters of ordinary construction such as is indicated by the numeral 11 in Fig. 1 and mowers of this character are provided with brackets 12 and lugs 13 to which the ordinary side runners are attached. In mounting the improved guard and divider the ordinary runner is discarded and the device is positioned with respect to the mower as shown in Fig. 1. An upstanding bracket member 14 mounted medially on the upper surface of the runner 5 is then bolted to the machine bracket 12 and a lug 15 which is adjustable with respect to the end portion of the runner because of the spaced apart bolt apertures 16, is bolted to the machine lug 13.

The device is particularly adapted for use in fields planted with matted plants such as peas and as the machine moves the plants adjacent the sides of the machine will be divided and separated by the pointed member 7 and somewhat elevated so that the cutting knives 17 of the machine may cut the same. The cut plants are then elevated by the member 9 and carried by the curved portion 10 over the bars 18 for distribution into windrows with the other cut material. Thus, it will be seen that the side portions of each row, instead of being run over and destroyed, are protected and conditioned for harvesting.

From the foregoing description it will be seen that the improved crop guard and divider is of very simple and novel construction, and is well adapted for the purpose set forth.

What is claimed as the invention is:

1. A mower attachment, comprising a runner portion, an elongated elevating portion thereabove extending from the front of the runner beyond the rear end thereof, and means for attaching the device to a mower.

2. A one-piece mower attachment, comprising a runner portion, an integral elongated elevating portion, and an integral dividing portion formed at the junction of the runner and elevating portions.

3. The combination with a mowing machine, of a crop guard and divider, comprising a flat runner portion, an elongated elevating portion extending upwardly from the forward end portion of the runner portion and beyond the rear end portion thereof, the junction of the runner and elevating portions being enlarged and pointed, the free end portion of the elevating portion being curved inwardly, and means securing the device to the side portion of the mowing machine.

In testimony whereof, we affix our signatures.

LEO J. TUCK.
LOUIS GETZINGER.